United States Patent [19]
Koop

[11] Patent Number: 5,353,296
[45] Date of Patent: Oct. 4, 1994

[54] MATERIALS PROCESSING WITH A HIGH REPETITION RATE ISOTOPIC CARBON DIOXIDE LASER

[75] Inventor: Dale E. Koop, Sunnyvale, Calif.

[73] Assignee: Coherent, Inc., Santa Clara, Calif.

[21] Appl. No.: 90,410

[22] Filed: Jul. 12, 1993

[51] Int. Cl.$^5$ .................................. H01S 3/22
[52] U.S. Cl. .................. 372/55; 219/121.6; 372/60; 372/81
[58] Field of Search .................. 372/55, 57, 59, 60, 372/81-90, 4; 219/121.6, 121.63-121.73, 121.85

[56] References Cited

U.S. PATENT DOCUMENTS

| Re. 30,898 | 4/1982 | Cantrell et al. | 372/4 X |
| 4,061,921 | 12/1977 | Cantrell et al. | 372/55 X |
| 4,163,199 | 7/1979 | Treanor | 372/60 X |
| 4,839,330 | 6/1989 | Hess et al. | 372/59 X |
| 5,062,842 | 11/1991 | Tiffany | 606/3 |
| 5,131,003 | 7/1992 | Mefferd | 372/65 |

OTHER PUBLICATIONS

K. M. Jeong, H. P. Chou, G. A. Theophanis & V. H. Hasson, "$CO_2$ Laser Gain Energy Extraction Using $^{12}C$ and $^{13}C$ Isotopes," $CO_2$ Lasers and Applications, 1989, SPIE vol. 1042, pp. 75-78 (No Month).

C. Freed, "Status of $CO_2$ Isotope Lasers and Their Applications in Tunable Laser Spectroscopy," *IEEE Journal of Quantum Electronics*, Aug. 1982, vol. QE-18, No. 8, pp. 1220-1228.

L. Ernestine, F. C. Freed & R. G. O'Donnell, "Small Gain and Saturation Intensity of 00° 1-[10°0, 02°0]$_{I\ and\ II}$ Vibrational Band Transmitions in Sealed-Off $CO_2$ Isotope Lasers," *IEEE Jurnal of Quantum Electronics*, vol. QE-18, No. 8, Aug. 1982, pp. 1229-1236.

D. G35013 F. Kroeker, M. A. DeFaccio, A. L. Pindroh, D. R. Guyer, C. H. Fisher & S. E. Moody, "Small Signal Gain and Vibrational Relaxation for $^{13}CO_2$," *Applied Optics*, 1989(Mar.), 28:897-900.

Primary Examiner—John D. Lee
Attorney, Agent, or Firm—Limbach & Limbach

[57] ABSTRACT

An laser system is disclosed for materials processing. The system includes an RF excited, conduction cooled, sealed gas laser. The lasing species in the gas mixture is an isotope of carbon dioxide and in the preferred embodiment is defined by the $^{13}CO_2$ isotope. The use of the $^{13}CO_2$ isotope functions to shorten the rise and fall times of the laser pulses. By this arrangement, the laser may be operated at higher repetition rates with a full depth of power modulation.

35 Claims, 4 Drawing Sheets

DEPTH OF MODULATION

DEPTH OF MODULATION

OPTICAL DUTY CYCLE FOR 30% RF MODULATION

MATERIALS PROCESSING WITH A HIGH REPETITION RATE ISOTOPIC CARBON DIOXIDE LASER

TECHNICAL FIELD

The subject invention relates to materials processing utilizing a high power, high repetition rate, pulsed laser beam wherein the pulses have short rise and fall times.

BACKGROUND OF THE INVENTION

Carbon dioxide gas lasers have been used in materials processing for quite some time. Carbon dioxide lasers are favored since they tend to generate relatively high powers for lower costs than other laser systems.

For certain applications such as engraving, data encoding, ceramic scribing, marking and paper perforation, pulsed carbon dioxide lasers with high repetition rates are desired. Sealed gas lasers available in the prior art are capable of generating usable outputs of up to 10Khz. Above that rate, the rise and fall times of the pulses tends to approach the length of the pulses and therefore the laser will not fully turn off between pulses. The extent which the laser will turn off between pulses can be defined by the percentage or depth of modulation. Under this definition, if there is no laser output between pulses, then the depth of modulation is 100 percent. On the other hand, if the laser generates an output in the period between excitation pulses, the depth of modulation is less than 100 percent and can be calculated based on the following formula:

$$\frac{(\text{Maximum Power} - \text{Minimum Power})}{\text{Maximum Power}} \quad (1)$$

As can be seen from equation (1), if the output power between energizing pulses drops to only one half of the maximum output power, the depth of modulation is 50 percent.

In the applications mentioned above, it is necessary to achieve modulation levels well over 50 percent and close to 90 percent is desired. As can be appreciated, when the beam is passing over a portion of material which should not be treated, the power should be off. If a significant portion of beam power is present, unwanted scoring, marking or partial perforations will occur in the work piece.

In order to achieve higher repetition rates, various material processing systems have utilized flowing gas lasers. In these lasers, the lasing gas is continuously recirculated. This approach permits the generation higher repetition rates with a good depth of modulation because the gas molecules storing the excitation energy are swept out of the cavity, thereby shortening the pulses. Unfortunately, flowing gas lasers are more complicated and require blowers and large reservoirs of carbon dioxide gas. Due to this added complexity and requirement for extra materials, the flowing gas lasers can cost twice as much as sealed gas lasers.

Due to the drawbacks of flowing gas lasers, significant effort has been made to increase the repetition rates of sealed carbon dioxide lasers while maintaining the desired modulation levels. For example, it is known that if the gas pressure is increased, the pulse widths can be somewhat shortened.

Another approach to shortening pulses is to vary the gas mixture. In a typical carbon dioxide laser, the gas mixture includes helium and nitrogen. The helium acts as a buffer gas while the nitrogen cooperates directly in the energy transfer. More specifically, nitrogen has a band gap energy similar to the energy gap between the ground state and the lasing state of carbon dioxide. Since there are no intermediate states in nitrogen, the atom acts as an energy storage device which can transfer that energy to the carbon dioxide molecules through collisions.

Nitrogen is a very important constituent of the gas mixture when longer, higher power pulses and greater efficiency is desired. However, in the applications discussed above, where short pulses are desired and relatively low power pulses are acceptable, the level of nitrogen in the gas mixture can be substantially lowered or even eliminated. In this manner, the fall time of the pulses can be significantly reduced allowing the repetition rates to be increased.

While variations in pressure and gas mixture have provided some improvements, the sealed gas lasers found in the prior art still cannot compete with the repetition rates attainable with the flowing gas lasers. Accordingly, it would be desirable to design a sealed gas laser which can generate a pulsed output having a repetition rate and modulation characteristics which would compete with the flowing gas lasers.

Therefore, it is an object of the subject invention to provide a sealed gas laser capable of generating a pulsed output having a high repetition rate.

It is a further object of the subject invention to provide a sealed gas laser which can generate a high repetition rate with a high level of modulation.

It is another object of the subject invention to provide a sealed carbon dioxide laser which can generate a pulsed output of up to 30Khz with a depth of modulation in excess of ninety percent.

It is still a further object of the subject invention to provide a sealed laser which utilizes an isotope of carbon dioxide as the lasing gas.

It is still another object of the subject invention to provide a sealed isotopic carbon dioxide laser which generates pulses having shorter rise and fall times.

It is still a further object of the subject invention to provide a sealed isotopic carbon dioxide laser wherein the pulse widths are much shorter than with standard carbon dioxide.

It is still another object of the subject invention to provide a laser system for materials processing which utilizes an isotopic carbon dioxide laser.

It is still a further object of the subject invention to provide a laser system utilizing an isotopic carbon dioxide laser having an output of 11.1 microns which will not be absorbed by a carbon dioxide assist gas.

SUMMARY OF THE INVENTION

In accordance with these and other objects, a laser system particularly suited for materials processing is disclosed. The system includes a sealed carbon dioxide gas laser for generating a pulsed output beam. In the preferred embodiment, the laser is excited by an RF generator and is of the type described in U.S. Pat. No. 5,131,003, assigned to the same assignee herein and incorporated by reference.

In accordance with the subject invention, the lasing species in the laser consists primarily of an isotope of carbon dioxide other than the $^{12}CO_2$ isotope. In the preferred embodiment, the $^{13}CO_2$ isotope is utilized. Although this isotope is more expensive that standard carbon dioxide, it is readily available and the amount of gas needed in a sealed system is relatively small so that the added costs are not significant. For purposes of this specification and claims, the term standard carbon dioxide is intended to refer to the $^{12}C^{16}O_2$ isotope while isotopic carbon dioxide is intended to refer to other isotopes of carbon dioxide gas.

In experiments performed with the $^{13}CO_2$ isotope, the rise and fall times of pulses were shortened significantly. For short pulses, on the order of the rise and fall times of the pulses, the pulse widths can be shortened by fifty percent or more using this technique. With these shorter pulse widths, the repetition rate of the laser can be increased substantially without adversely affecting the modulation level. By appropriate use of gas mixture and pressure, repetition rates of 30Khz have been demonstrated with a modulation level near ninety percent.

The use of the $^{13}CO_2$ isotope in lasers is not new. The $^{13}CO_2$ isotope has been extensively explored in spectroscopic studies. Investigations have been carried out with respect to signal gain and decay rates of the $^{13}CO_2$ isotope. The $^{13}CO_2$ isotope has also been used as a lasing medium for atmospheric measurements and communications since the 11.1 micron wavelength output is not absorbed by the standard carbon dioxide gas in the atmosphere.

More recently, the assignee herein introduced a sealed $^{13}CO_2$ isotope laser for medical purposes. This laser has proved highly desirable for use in laparoscopic surgery where standard carbon dioxide is used as a purge gas. In these systems, even though the distance traveled by the laser beam down the laparoscopic channel is short (compared with the distances involved in atmospheric communications), the absorption of the standard carbon dioxide lasing wavelength of 10.6 microns is quite high in the $^{12}CO_2$ purge gas because the purge gas is trapped in the laparoscopic resulting in runaway thermal absorption. By using the $^{13}CO_2$ isotope in the laser and generating an output of 11.1 microns, the absorption in the $^{12}CO_2$ purge gas can be eliminated resulting in more power reaching the patient as well as the elimination of thermal lenses in the purge gas which tend to defocus the treatment beam. This development is described in detail in U.S. Pat. No. 5,062,842, incorporated herein by reference.

It is believed that none of the prior art references disclose the benefits which can be obtained in using isotopic carbon dioxide gas as the lasing species for materials processing. Specifically, none of the references relates to the use of the $^{13}CO_2$ isotope in a pulsed laser for generating high repetition rates while maintaining a full depth of modulation in the output power.

DETAILED DESCRIPTION OF THE PREFERRED EMBODIMENT

Figure 1:
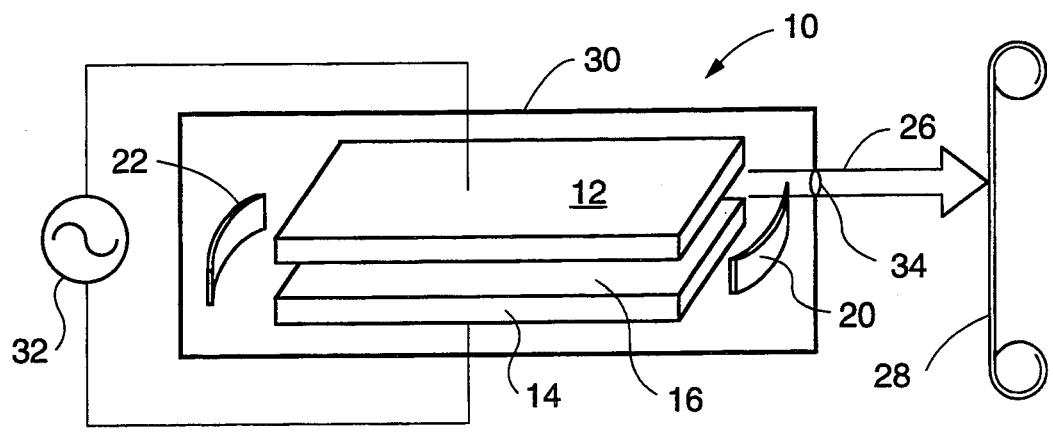
FIG. 1 is a schematic diagram of a laser system formed in accordance with the subject invention.

Referring to FIG. 1, there is illustrated a schematic diagram of an RF excited, slab waveguide laser 10 of the type described in the above identified U.S. Pat. No. 5,131,003. This laser includes a pair of elongated, water-cooled electrodes 12 and 14 that are arranged to define a slab shaped discharge region 16. A pair of mirrors 20 and 22 are mounted adjacent the ends of the electrodes and define a hybrid resonator, stable in the waveguide or narrow dimension and unstable in the free-space or wider dimension. The laser beam 26 is coupled out of the resonator along the edge of one of the mirrors 20. The laser beam 26 can be used for processing materials 28 such as engraving, data encoding, ceramic scribing, marking and paper perforation.

The electrodes are mounted in a sealed housing 30. The lasing gas mixture is held in the housing. The gas is excited by an RF generator 32 the output of which is applied to the electrodes 12 and 14. Suitable impedance matching networks are provided as well known in the prior art. A transparent output window 34 is provided for transmitting the beam out of the housing 30.

The laser shown in FIG. 1 is particularly suited for the implementation of the subject invention. More specifically, the conduction cooled slab structure allows for relatively high output power to be generated per unit length. The large volume of gas available between the electrodes and in the active gain region leads to large pulse energies suitable for material processing.

Another important feature relates to the RF excitation. This laser is typically energized at radio frequencies of tens of megahertz. The RF power source can also be modulated with square wave pulses at rates of many kilohertz. The square wave pulses can create relatively short laser output pulses compared to DC excited carbon dioxide lasers. However, as noted above, even with RF excitation, full depth of modulation of the output power between pulses could not be maintained with a standard carbon dioxide mixture at pulse repetition rates over 10 Khz.

In accordance with the subject invention, this limitation is overcome by replacing the standard carbon dioxide lasing gas with another isotope of carbon dioxide gas. In the preferred embodiment, the $^{13}CO_2$ isotope is used. The $^{13}CO_2$ isotope leads to pulses having faster rise times and faster fall times. The extent of this change is set forth below in the Tables 1 through 4.

Figure 2:
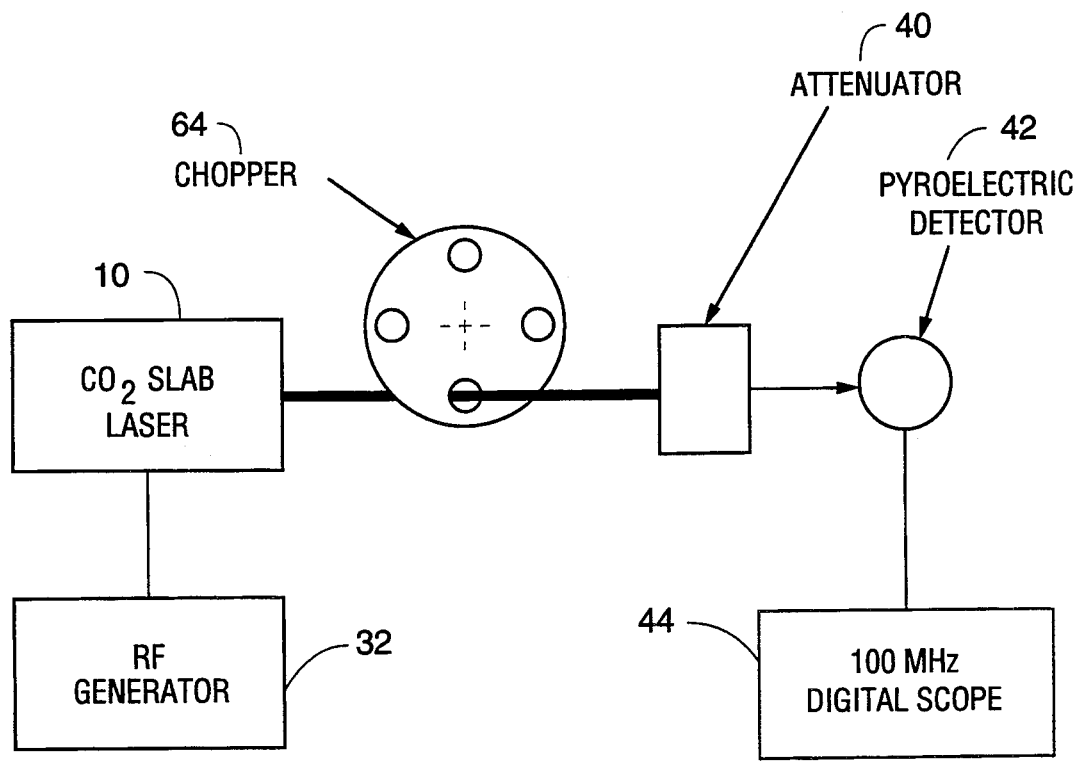
FIG. 2 is a schematic diagram illustrating an experimental arrangement used to measure the shape of pulses.

The experimental set up is illustrated in FIG. 2. In this experiment, an RF excited, slab waveguide laser 10 was used that is marketed by the assignee herein as a Diamond Laser, Model 60. This laser had a discharge volume of 60cm by 4.4 cm by 2 mm and was operated at cavity pressures of 80 and 100 torr. Two different lasing gas mixtures were tested. The first mixture was helium, nitrogen and carbon dioxide in the ratio of 3:1:1. The second mixture was helium and carbon dioxide at the ratio of 3:1. Both lasers had an additional five percent xenon gas. RF excitation was at 81 MHz with 4 Kw of peak power. All measurements were taken with the laser using standard carbon dioxide and repeated with the $^{13}CO_2$ isotope. The purity of the $^{13}CO_2$ isotope was greater than 99 percent. Except for the differences noted above, all other parameters were kept constant.

The optical pulse shape was passed though an attenuator 40 and then measured with a pyroelectric detector 42. The output of the detector 42 was supplied to 100 MHz digital storage oscilloscope 44. To determine the optical rise and fall time constants set forth in Tables 1 to 4, the laser was modulated on for 100 microseconds at a repetition rate of 1 KHz. Twenty separate pulses were captured and averaged on the oscilloscope 44. Rise and fall times were derived from an exponential fit through the 90 percent to 10 percent levels of the peak pulse height of the average pulse. Each measurement was repeated four times.

TABLE 1

Decay Constants - 80 Torr Cavity Pressure

| Gas mix | Isotope | | Ratio |
|---|---|---|---|
| He:N$_2$:CO$_2$ | $^{13}CO_2$ | $^{12}CO_2$ | $^{12}CO_2/^{13}CO_2$ |
| 3:1:1 | 17.3 ± 1.3 μs | 33.1 ± 1.7 μs | 1.9 ± .2 |
| 3:0:2 | 10.0 ± 1.2 μs | 16.5 ± 1.5 μs | 1.7 ± .2 |

TABLE 2

Decay Constants - 100 Torr Cavity Pressure

| Gas mix | Isotope | | Ratio |
|---|---|---|---|
| He:N$_2$:CO$_2$ | $^{13}CO_2$ | $^{12}CO_2$ | $^{12}CO_2/^{13}CO_2$ |
| 3:1:1 | 9.4 ± 1.8 μs | 23.9 ± 2.2 μs | 2.5 ± .5 |
| 3:0:2 | 6.5 ± 1.1 μs | 10.8 ± 1.2 μs | 1.7 ± .3 |

TABLE 3

Optical Rise Time Constants - 80 Torr Cavity Pressure

| Gas ratios | Isotope | | Ratio |
|---|---|---|---|
| He:N$_2$:CO$_2$ | $^{13}CO_2$ | $^{12}CO_2$ | $^{12}CO_2/^{13}CO_2$ |
| 3:1:1 | 11.6 ± 1.5 μs | 23.4 ± 1.5 μs | 2.0 ± .3 |
| 3:0:2 | 11.2 ± 1.7 μs | 20.1 ± 1.3 μs | 1.8 ± .3 |

TABLE 4

Optical Rise Time Constants - 100 Torr Cavity Pressure

| Gas ratios | Isotope | | Ratio |
|---|---|---|---|
| He:N$_2$:CO$_2$ | $^{13}CO_2$ | $^{12}CO_2$ | $^{12}CO_2/^{13}CO_2$ |
| 3:1:1 | 12.9 ± 2.7 μs | 20.8 ± 1.9 μs | 1.6 ± .4 |
| 3:0:2 | 8.3 ± 1.2 μs | 15.5 ± 1.5 μs | 1.9 ± .3 |

As can be seen in Tables 1 to 4, although the decay constants (fall times) vary with pressure and gas mix, for any given pressure or mix, the decay rate for a pulse from the $^{13}CO_2$ isotope is roughly twice as fast as the decay rate for the standard carbon dioxide mix. Similarly, although the optical rise time constants vary with pressure and gas mix, for any give pressure or mix, the rise time for a pulse using the $^{13}CO_2$ isotope ranges from 1.6 to 2.0 times faster than the rise time for the standard carbon dioxide mix.

The Tables also show that pulse widths can be shortened by varying the gas mixture and the pressure. For example, removing nitrogen also decreases the fall time of the pulse by roughly a factor of two. Removal of the nitrogen seems to have little effect on the rise time of the pulses. Increasing the pressure from 80 torr to 100 torr also tends to shorten the fall time but does not significantly alter the rise time. By the proper selection of the pressure, gas mixture and use of the $^{13}CO_2$ isotope, the fall time can be shortened by a factor of five while the rise time can be shortened by a factor of two to three.

Figure 3:
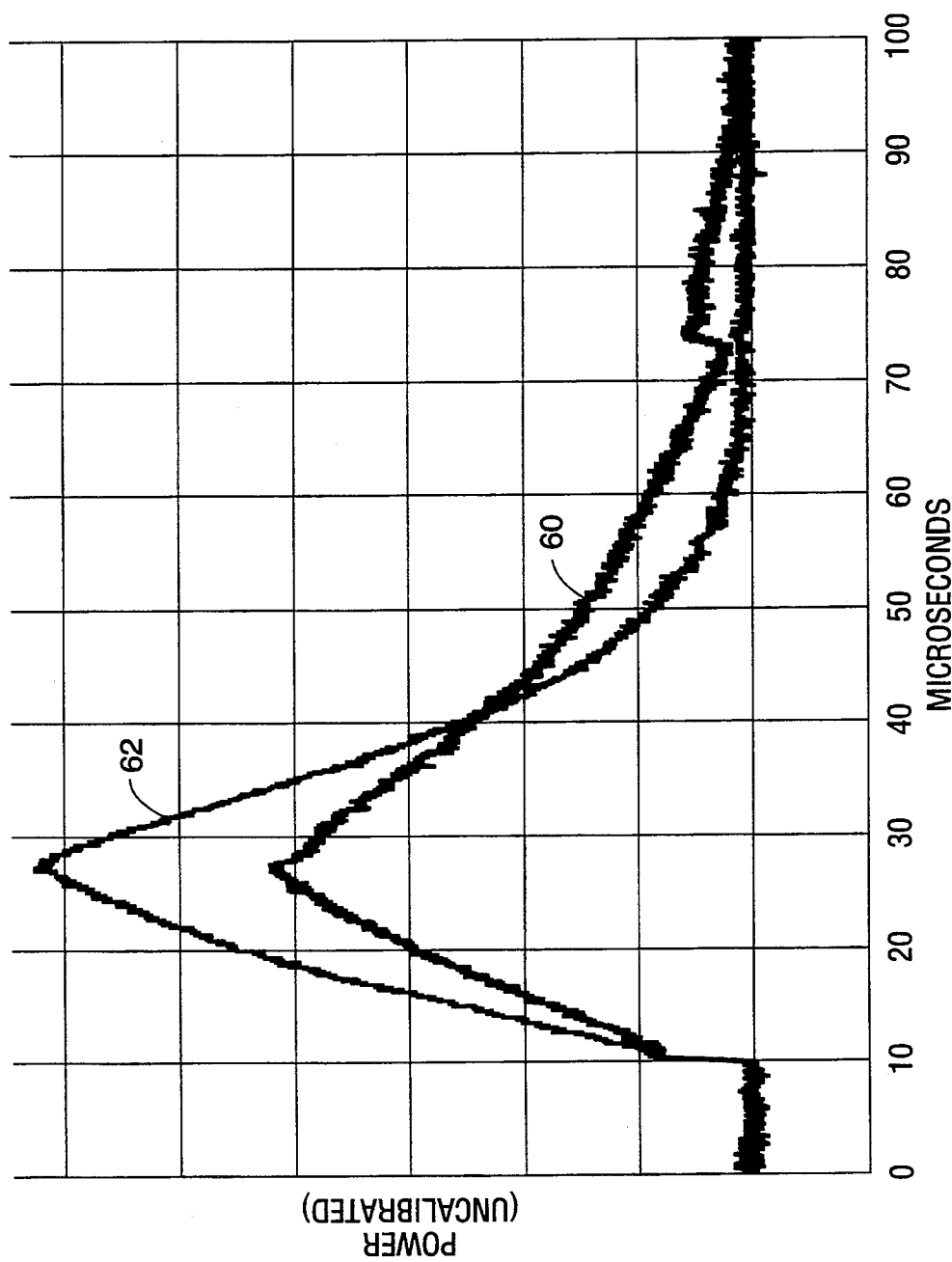
FIG. 3 is a graph comparing the shape of a pulse from a laser with a standard carbon dioxide lasing gas with the shape of a pulse from a laser using the $^{13}CO_2$ isotope as the lasing gas.

FIG. 3 illustrates traces of two pulses illustrating this difference in graphic form. In this Figure, the laser was modulated at 50 microseconds at a repetition rate of 4 Khz. The gas mix was helium, nitrogen and carbon dioxide in the ratio of 3:0.75:1.25 and the pressure was 90 torr. Curve 60 represents the trace were standard carbon dioxide was used while curve 62 represents the $^{13}CO_2$ isotope.

As can be seen in FIG. 3, the slopes of the leading and trailing edges of the pulse for the $^{13}CO_2$ isotope are much sharper than for the standard carbon dioxide mix In addition the $^{13}CO_2$ isotope generates a much narrower pulse. It is also significant that the $^{13}CO_2$ isotope pulse has peak power 20 percent greater than standard carbon dioxide.

Figure 4:
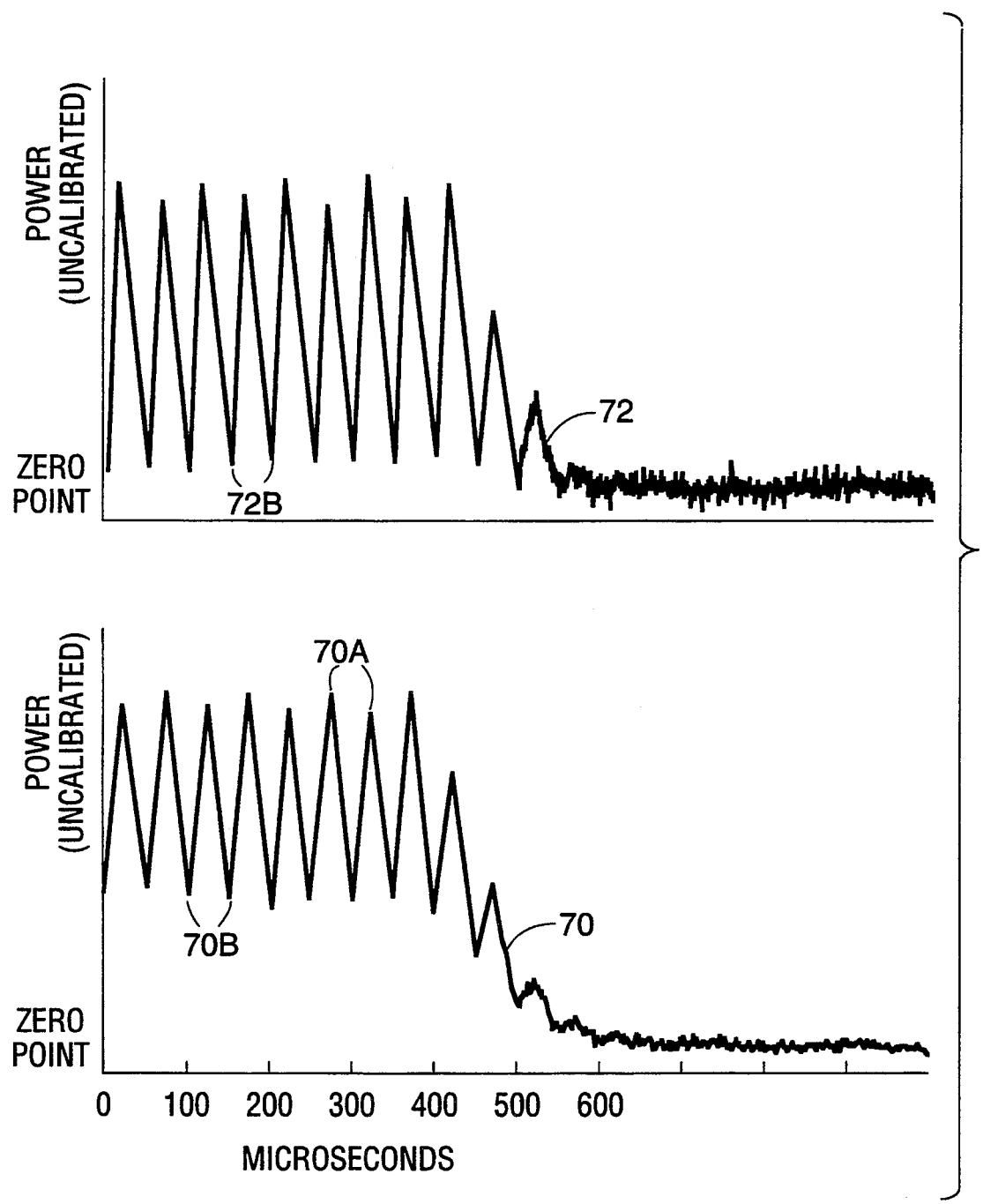
FIG. 4 are traces comparing the depth of modulation obtained at 20 Khz for a standard carbon dioxide laser and an isotopic carbon dioxide laser.

The narrow pulse widths which can be obtained using the $^{13}CO_2$ isotope allows the laser to be operated at higher repetition rates with good power modulation. The depth of modulation was calculated using the approach set forth in equation (1) and the measurements obtained from the pyroelectric detector 42 (FIG. 2). FIG. 4 illustrates an example of the traces used for calculating the depth of modulation at 20 Khz. As seen therein, the spread between the maximum and minimum powers was taken as the deference between the height of the upper and lower output peaks (i.e. 70a and 70b or 72a and 72b). The right hand portion of each curve was used as a base line for defining the zero power level. The zero power level was determined by using a beam chopper 64 (FIG. 2) to periodically interrupt the laser beam before reaching the pyroelectric detector. The beam chopper was used to define a base line because the pyroelectric detector can only measure AC signals.

In the example in FIG. 4, a 50% duty cycle was used. The gas for both measurements was a 3:1:1 mixture of Helium, Nitrogen and carbon dioxide at 100 torr. Curve 70 represents standard carbon dioxide while curve 72 represents the $^{13}CO_2$ isotope.

As can be seen, the low points 72b of curve 72 for the $^{13}CO_2$ isotope correspond substantially to the zero power level meaning that the isotopic laser is shutting off and the depth of modulation is nearly 100 percent. In contrast, for the standard carbon dioxide laser shown in curve 70, the low points 70b correspond to only about half way to the zero power level indicating a depth of modulation of only 50 percent.

Figure 5:
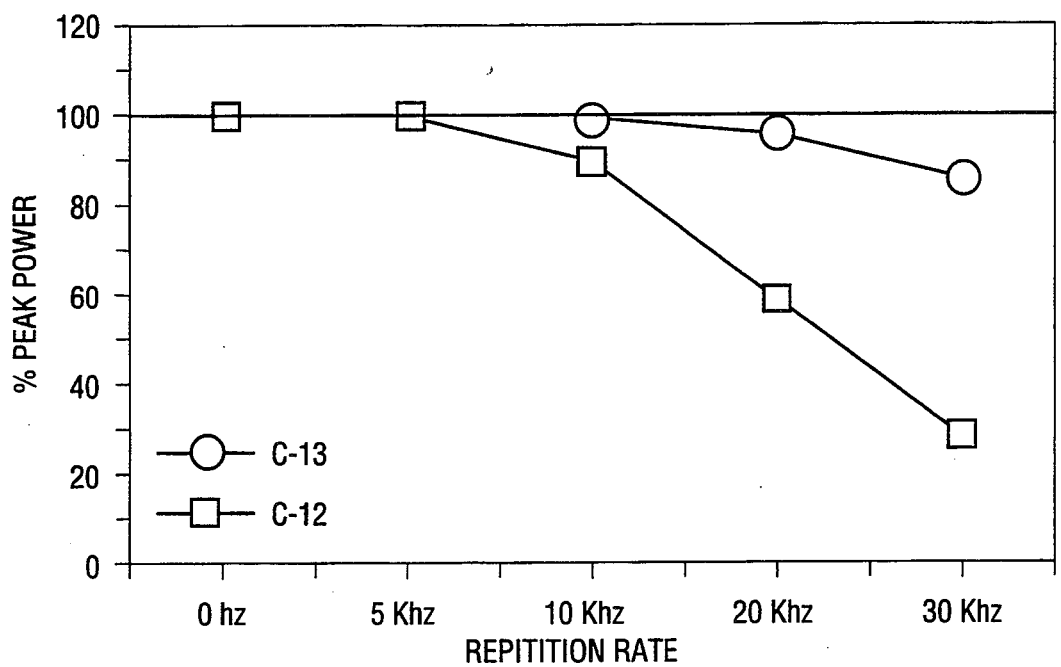
FIG. 5 is a chart comparing the depth of modulation of a standard carbon dioxide laser at various repetition rates to the depth of modulation for a laser with the $^{13}CO_2$ isotope as the lasing species.

FIG. 5 illustrates this data compiled for repetition rates of 5 Khz, 10 Khz, 20 Khz and 30 Khz. The laser was modulated at a 50 percent duty cycle. The gas mixture for both the $^{13}CO_2$ isotope and the standard carbon dioxide was 3:0:2 of He:N$_2$ :CO$_2$ at 100 torr.

As can be seen, for standard carbon dioxide, the depth of modulation starts to drop off from a full 100 percent at around 10 Khz. By 20 Khz, the depth of modulation is at about 50 percent. At 30 Khz, the depth of modulation is near 30 percent meaning that when the laser is supposed to be off, it is actually generating an output which is 70 percent of the maximum power.

In contrast, with the $^{13}CO_2$ isotope, the depth of modulation at 20 Khz is still almost 100 percent, while at 30 Khz, is close to ninety percent. Thus, the $^{13}CO_2$ isotope laser can be used to produce the same results in materials processing applications achieved by a standard carbon dioxide laser, but at a repetition rate three times higher. By this arrangement, processing speeds can be substantially increased.

Figure 6:
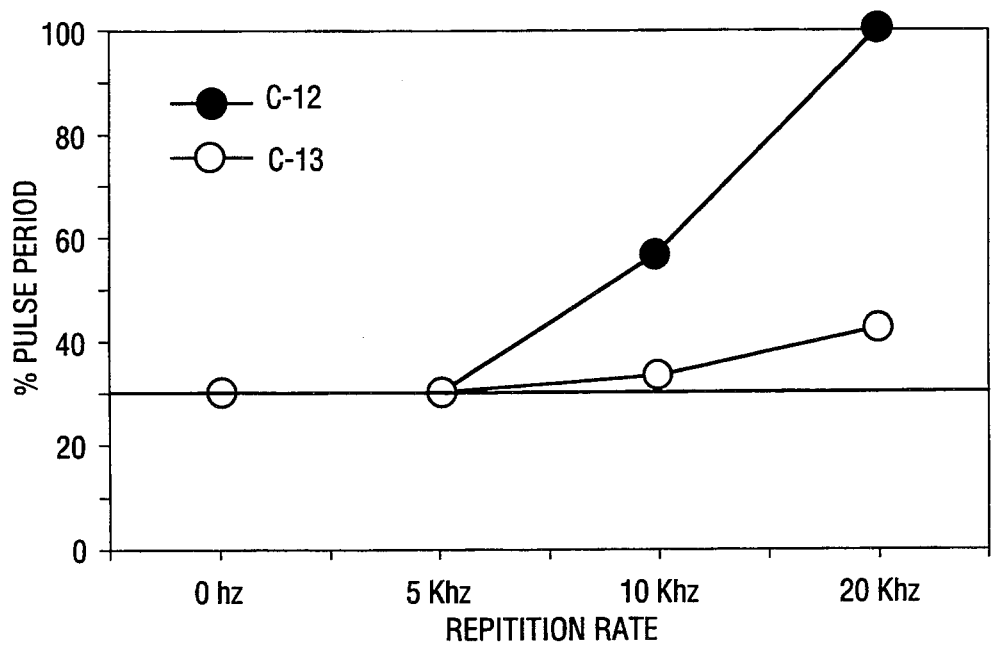
FIG. 6 is a graph illustrating the optical modulation of standard carbon dioxide laser with a laser utilizing the $^{13}CO_2$ isotope.

FIG. 6 illustrates the actual modulation of the laser output. In this experiment, the laser was operated with a 30 percent duty cycle. The gas mixture and pressure were the same as that in used in the FIG. 5 experiments. The total optical pulse width was defined by the 10 percent peak power points of the optical pulse. The vertical axis of the graph represents the percentage of the pulse period (between excitation pulses) that the laser is generating an output. The dotted horizontal line illustrates the ideal situation where the pulse is on for the exact period as the duty cycle (30 percent). This graph illustrates the broadening of the pulses as a function of repetition rate.

As can be seen, for standard carbon dioxide, the pulse width increases to 50 percent of the pulse period at 10 Khz. At 20 Khz, the pulse has broadened to cover the entire period and thus, the laser never shuts off. In contrast, for the $^{13}CO_2$ isotope laser, the pulse width broadened to only about 40 percent of the period at 20 Khz.

In many material processing applications, an assist gas is channeled to the treatment site. For example, an oxygen jet has been used to initiate an exothermic reaction and enhance the cutting rate on thick sections of metal. Inert gases such as argon or nitrogen are used to produce cleaner edges on thin metals. A gas jet also serves to protect the face of the lenses a the delivery system from backscattered materials. In addition, a gas jet can be used to dislodge debris from the workpiece.

Carbon dioxide is a desirable assist gas because it prevents oxidation. Moreover, since carbon dioxide is heavier than air, it can be used to blanket the sheet of material being processed. Unfortunately, carbon dioxide gas is often not selected as the assist gas because it tends to absorb the 10.6 micron radiation from the carbon dioxide laser. As noted above, carbon dioxide gas has a relatively low absorption level for the 11.1 micron radiation for the $^{13}CO_2$ isotope. Therefore, a laser system which utilized the $^{13}CO_2$ isotope would not run into these absorption problems and standard carbon dioxide could be more readily used as the assist gas.

While the subject invention has been described with reference to the preferred embodiments, various changes and modifications could be made therein, by one skilled in the art, without varying from the scope and spirit of the subject invention as defined by the appended claims. For example, the $^{13}CO_2$ isotope could be used in DC excited laser to reduce the rise and fall times of the output pulses allowing for operation at higher repetition rates.

I claim:

1. A laser for use in materials processing comprising:
a sealed housing for holding a lasing gas mixture;
a resonant cavity defining a gas discharge region;
a pair of electrodes for exciting said gas mixture in said gas discharge region; and
a pulsed RF excitation means for energizing said electrodes and exciting said gas mixture in said gas discharge region to generate a pulsed laser beam and wherein the lasing species in said gas mixture consists primarily of an isotope of carbon dioxide with the remaining constituents and pressure of said gas mixture being selected to provide a depth of modulation of said laser output of at least eighty percent at pulse repetition rates up to 20 Khz.

2. A laser as recited in claim 1 wherein the rise and fall times of each pulse are at least 1.6 times as fast as the rise and fall times of a pulse that would be created using standard carbon dioxide gas as the lasing species.

3. A laser as recited in claim 1 wherein said gas mixture includes nitrogen and wherein the pressure of the isotopic carbon dioxide is greater than the pressure of the nitrogen.

4. A laser as recited in claim 1 wherein said gas mixture consists primarily of isotopic carbon dioxide, helium and xenon.

5. A laser as recited in claim 1 wherein the lasing species is the $^{13}CO_2$ isotope.

6. A laser for use in materials processing comprising:
a sealed housing for holding a lasing gas mixture;
a resonant cavity defining a gas discharge region;
a pair of electrodes for exciting said gas mixture in said gas discharge region; and
a pulsed RF excitation means for energizing said electrodes and exciting said gas mixture in said gas discharge region to generate a pulsed laser beam and wherein the lasing species in said gas mixture consists primarily of an isotope of carbon dioxide with the remaining constituents and pressure of said gas mixture being selected so that the rise and fall times of each pulse are at least 1.6 times as fast as the rise and fall times of a pulse that would be created using standard carbon dioxide gas as the lasing species.

7. A laser as recited in claim 6 wherein said gas mixture includes nitrogen and wherein the pressure of the isotopic carbon dioxide is greater than the pressure of the nitrogen.

8. A laser as recited in claim 6 wherein said gas mixture consists primarily of isotopic carbon dioxide, helium and xenon.

9. A laser as recited in claim 6 wherein the lasing species is the $^{13}CO_2$ isotope.

10. A laser as recited in claim 6 wherein the depth of modulation of said laser output is at least eighty percent at pulse repetition rates greater than 20 Khz.

11. A laser system for materials processing comprising:
a sealed gas discharge laser for generating a pulsed output beam and with the lasing gas being predominantly an isotope of carbon dioxide, whereby said laser can be operated at repetition rates in a range between 10 and 20 Khz while maintaining a depth of modulation between the output pulses; and
means for directing the beam to the material to be processed.

12. A laser system as recited in claim 11 wherein said lasing gas is excited with an RF signal.

13. A laser system as recited in claim 11 wherein the gas in the sealed discharge laser is defined by a gas mixture and wherein the gas mixture includes nitrogen and wherein the pressure of the isotopic carbon dioxide is greater than the pressure of the nitrogen.

14. A laser system as recited in claim 11 wherein the gas in the sealed discharge laser is defined by a gas mixture wherein the gas mixture consists primarily of isotopic carbon dioxide, helium and xenon.

15. A laser system as recited in claim 11 wherein the lasing species is the $^{13}CO_2$ isotope.

16. A laser system as recited in claim 11 further including a means for directing a standard carbon dioxide assist gas to the material to be processed.

17. A laser system for materials processing comprising:
a sealed gas discharge laser for generating a pulsed output beam and with the lasing gas being predominantly an isotope of carbon dioxide, wherein the gas in the sealed discharge laser is defined by a gas mixture and wherein the pressure of the gas mixture and the composition of the constituents are selected to provide a depth of modulation of said laser output of at least eighty percent at pulse repetition rates up to 20 Khz; and means for directing the beam to the material to be processed.

18. A laser system as recited in claim 17 wherein the lasing species is the $^{13}CO_2$ isotope.

19. A laser system for materials processing comprising:

a sealed gas discharge laser for generating a pulsed output beam and with the lasing gas being predominantly an isotope of carbon dioxide, wherein the gas in the sealed discharge laser is defined by a gas mixture and wherein the pressure of the gas mixture and the composition of the constituents are selected so that the rise and fall times of each pulse are at least 1.6 times as fast as the rise and fall times of a pulse that would be created using standard carbon dioxide gas as the lasing species; and means for directing the beam to the material to be processed.

20. A laser system as recited in claim 19 wherein the lasing species is the $^{13}CO_2$ isotope.

21. A method for processing materials comprising:

generating a pulsed laser beam from a gas discharge laser, with the lasing gas being predominantly an isotope of carbon dioxide, whereby said laser can be operated at repetition rates in a range between 10 and 20 Khz while maintaining a depth of modulation of at least ninety percent between the output pulses; and directing the beam to the material to be processed.

22. A method as recited in claim 21 wherein the laser is excited by an RF signal.

23. A method as recited in claim 21 wherein the laser is sealed.

24. A method as recited in claim 23 wherein the gas in the sealed discharge laser is defined by a gas mixture and wherein the gas mixture includes nitrogen and wherein the pressure of the isotopic carbon dioxide is greater than the pressure of the nitrogen.

25. A method as recited in claim 23 wherein the gas in the sealed discharge laser is defined by a gas mixture wherein the gas mixture consists primarily of isotopic carbon dioxide, helium and xenon.

26. A method as recited in claim 25 wherein the lasing species is the $^{13}CO_2$ isotope.

27. A method as recited in claim 21 wherein the lasing species is the $^{13}CO_2$ isotope.

28. A method as recited in claim 21 further including the step of directing a flow of an assist gas to the material to be processed and wherein the assist gas is standard carbon dioxide.

29. A method for processing materials comprising:

generating a pulsed laser beam from a sealed gas discharge laser, with the lasing gas being predominantly an isotope of carbon dioxide, wherein the gas in the sealed discharge laser is defined by a gas mixture and wherein the pressure of the gas mixture and the composition of the constituents are selected to provide a depth of modulation of said laser output of at least eighty percent at pulse repetition rates up to 20 Khz; and directing the beam to the material to be processed.

30. A method as recited in claim 29 wherein the lasing species is the $^{13}CO_2$ isotope.

31. A method for processing materials comprising:

generating a pulsed laser beam from a sealed gas discharge laser, with the lasing gas being predominantly an isotope of carbon dioxide, wherein the gas in the sealed discharge laser is defined by a gas mixture and wherein the pressure of the gas mixture and the composition of the constituents are selected so that the rise and fall times of each pulse are at least 1.6 time as fast as the rise and fall times of a pulse that would be created using standard carbon dioxide gas as the lasing species; and directing the beam to the material to be processed.

32. A laser for use in materials processing comprising:

a sealed housing for holding a lasing gas mixture;

a resonant cavity defining a gas discharge region;

a pair of electrodes for exciting said gas mixture in said gas discharge region; and a pulsed RF excitation means for energizing said electrodes and exciting said gas mixture in said gas discharge region to generate a pulsed laser beam and wherein the lasing species in said gas mixture consists primarily of an isotope of carbon dioxide with the remaining constituents and pressure of said gas mixture being selected to provide a depth of modulation of said laser output of at least ninety percent at pulse repetition rates in the range of 10 to 20 Khz.

33. A laser as recited in claim 32 wherein the lasing species is the $^{13}CO_2$ isotope.

34. A laser for use in materials processing comprising:

a sealed housing for holding a lasing gas mixture;

a resonant cavity defining a gas discharge region;

a pair of electrodes for exciting said gas mixture in said gas discharge region; and a pulsed RF excitation means for energizing said electrodes and exciting said gas mixture in said gas discharge region to generate a pulsed laser beam and wherein the lasing species in said gas mixture consists primarily of an isotope of carbon dioxide with the remaining constituents and pressure of said gas mixture being selected to provide a depth of modulation of said laser output of at least ninety-five percent at pulse repetition rates up to 10 Khz.

35. A laser as recited in claim 34 wherein the lasing species is the $^{13}CO_2$ isotope.

* * * * *